March 16, 1965 C. W. VERRELL ETAL 3,173,658
POLE TOOL
Filed Oct. 8, 1962 2 Sheets-Sheet 1
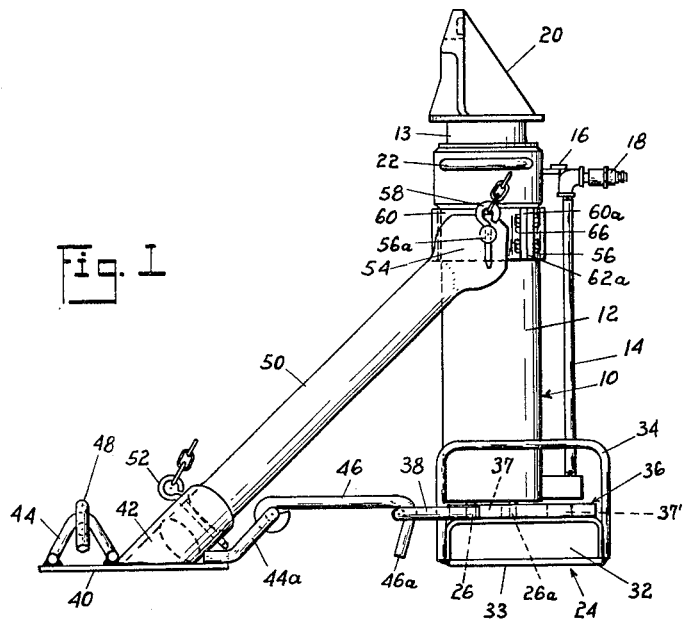
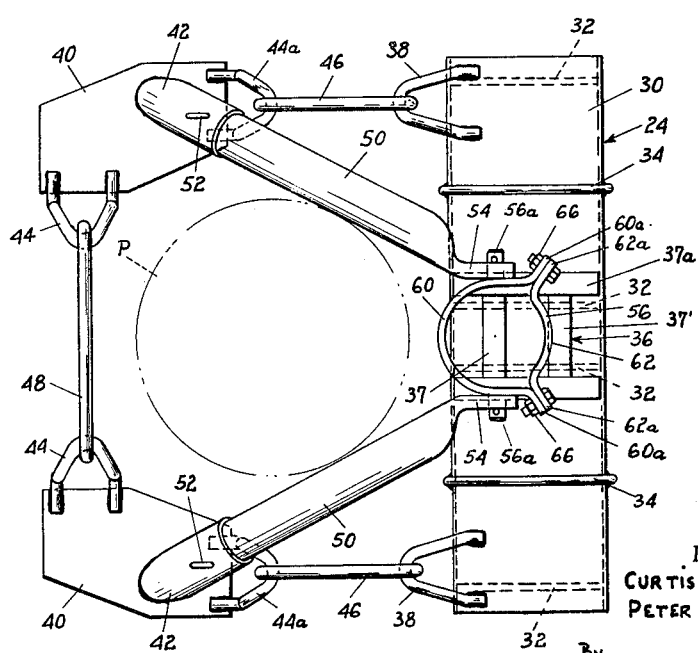
INVENTORS
CURTISS W. VERRELL AND
PETER LICURSI
BY Teare, Tetzer & Teare
ATTORNEYS March 16, 1965 C. W. VERRELL ETAL 3,173,658
POLE TOOL
Filed Oct. 8, 1962 2 Sheets-Sheet 2
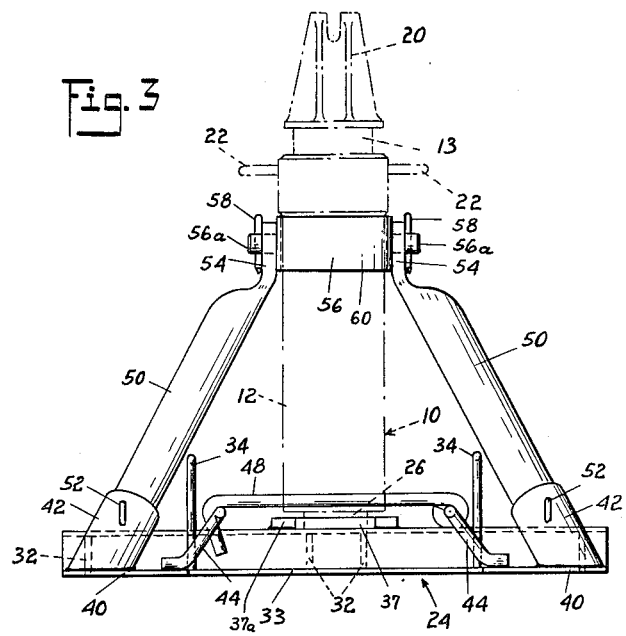
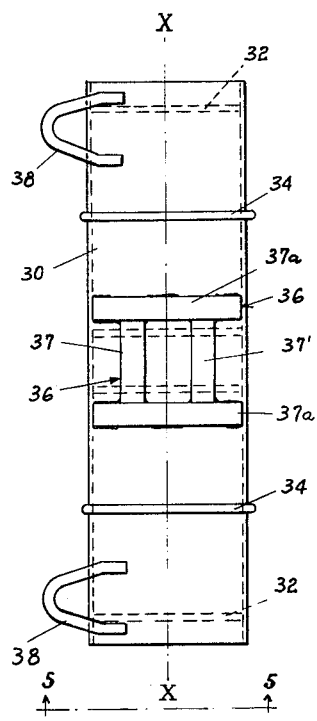
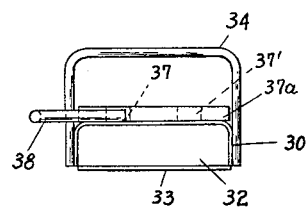
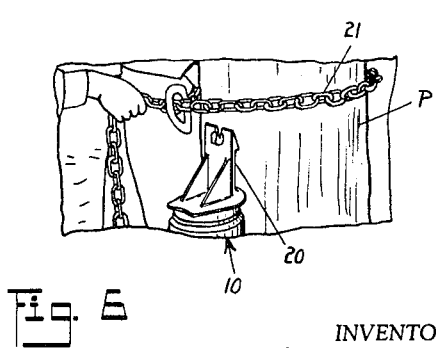
INVENTORS
CURTISS W. VERRELL AND
BY PETER LICURSI
Jeane, Fetzer & Jeane
ATTORNEYS United States Patent Office 3,173,658
Patented Mar. 16, 1965

3,173,658
POLE TOOL
Curtis W. Verrell, Fairview Park, and Peter Licursi, Seven Hills, Ohio, assignors, by mesne assignments, to The Ohio Brass Company, Mansfield, Ohio, a corporation of New Jersey
Filed Oct. 8, 1962, Ser. No. 228,929
12 Claims. (Cl. 254—29)

This invention relates in general to means for removing or pulling poles or the like from the ground, and more particularly to a portable, fluid powered pole jack.

In the utility field of endeavor, it is oftentimes necessary to remove a pole, such as a utility pole, from its implanted position in the ground. Oftentimes in the past, this was accomplished by digging around the pole and then using the conventional well known derrick on a utility type truck to wrench the pole from the ground. If the pole had been sawed off a few feet from ground level, the removal operation was even more difficult. Such conventional procedures are difficult and time consuming, necessitating considerable man hours of work and thus are costly.

In the copending United States patent application of George H. Eckels Serial No. 187,689, filed April 16, 1962, there is disclosed a portable, fluid powered pole jack which may be set up by a single workman, and which may be expeditiously coupled to a source of fluid power, for instance the source of power conventionally found in a utility truck, for lifting or pulling a pole from planted condition in the ground.

The present invention provides a portable, fluid powered pole jack which has improved characteristics as compared to that of the aforementioned application, and more particularly one which has greater flexibility, giving improved stability to the pole jack, when it is disposed in position adjacent the pole or pole butt to be pulled.

Accordingly, an object of the invention is to provide a novel, portable pole jack, for expeditiously removing pole and/or pole butts from the ground.

Another object of the invention is to provide a novel, portable, fluid powered pole jack which may be readily carried, set up and operated by a single workman, and which will quickly and effectively lift a pole or pole butt out of implanted relationship in the ground.

A more specific object of the invention is to provide a novel, portable, fluid powered pole jack, comprising a fluid powered ram, and a detachable base assembly which is adapted for mounting the ram thereon, with the ram including means for quickly attaching a flexible gripping member thereto, which member is adapted to encircle a pole or pole butt to be lifted from implanted position in the ground, and wherein the detachable base assembly is of a construction possessing considerable adjustability or flexibility, for more effectively compensating for uneven ground on which the pole jack may be used.

Another specific object of the invention is to provide a novel, fluid powered pole jack of the latter mentioned type wherein the detachable base assembly is comprised of a plurality of separate parts which are readily assembleable and readily disassembleable, and which arrangement provides for considerable flexibility for the base assembly, for more optimumly compensating for uneven ground on which it may be utilized, but which will possess adequate stability, to effectively support the fluid powered ram and effect the removal of a pole from implanted position in the ground.

A still further object of the invention is to provide a novel, portable, fluid powered pole jack which is rugged in construction, which is highly effective in lifting or pulling a pole or a pole butt from implanted position in the ground, and which is highly desirable from an economic standpoint.

Other objects and advantages of the invention will be apparent from the following description taken in conjunction with the accompanying drawings wherein:

FIG. 1 is a side elevational view of the mechanism of the invention;

FIG. 2 is a top plan view of the mechanism of FIG. 1, but with the ram member having been removed; in phantom lines is illustrated a desirable position of the mechanism with respect to a pole;

FIG. 3 is an end elevational view of the mechanism of FIG. 1, taken from the left hand end thereof, with the ram member shown in phantom lines;

FIG. 4 is a top plan view of one part of the base assembly of the pole jack;

FIG. 5 is an end elevational view of the FIG. 4 part, taken generally along the plane of line 5—5 of FIG. 4, looking in the direction of the arrows;

FIG. 6 is a reduced size, fragmentary, view of the upper end of the pole jack and the associated flexible member, which is adapted to encircle the pole or pole butt in gripping relation, for lifting the pole from its planted condition in the ground.

Referring now again to the drawings, the pole jack comprises a generally vertically extending ram 10 including a cylinder 12 with a piston (not shown) disposed in the cylinder and having a piston rod 13 projecting out of the upper end of the cylinder. An external conduit or pipe 14 may be provided running along the lengthwise dimension of the cylinder, as shown in FIG. 1, with the conduit communicating at its lower end with the underside of the piston head, and with the upper end of the conduit being attached to the external wall of the cylinder, as by means of bracket 16. A coupling or fitting 18 may be provided for readily attaching a fluid distributing line to the conduit 14 and as for instance a flexible hose, coupled at its other end to a source of pressurized fluid for operating the ram. The cylinder 12 above the piston head may be provided with another fitting (not shown) to which may be detachably connected another fluid distributing line or hose. Attached to the outer end of the piston rod 13 is the jack head 20, which is adapted to coact with a flexible member such as a chain 21 (FIG. 6) which in turn is adapted to encircle an associated pole or pole butt in gripping relation therewith, for lifting the pole butt or pole out of implanted relation in the ground upon application of fluid pressure to conduit 14 of the pole jack.

The upper end of the cylinder is preferably provided with laterally extending handle portions 22 for conveniently handling the ram and assembling it with the detachable base assembly 24, with which the present invention is especially concerned. The bottom end of the cylinder 12 may be provided with depending lugs 26, 26a, for a purpose to be hereinafter set forth.

Reference may be had to the aforementioned copending patent application Serial No. 187,689 for a more detailed description of the ram member 10 of the pole jack, and its operation.

The base assembly 24 of the pole jack may comprise an elongated transverse or anchor section 30, of channel shaped configuration in end elevation (FIG. 5) having spaced cross ribs 32 on its underside. Member 30 is preferably provided with a bottom plate 33 extending across its full extent. Handles 34 may be provided, for conveniently lifting the base assembly, and a raised lug section 36 is provided, generally centrally of section 30, for a purpose to be hereinafter described. As best seen in FIG. 4, lug section 36 comprises spaced bars 37, 37' extending parallel to axis X—X of member 30 and spaced bars 37a running transverse of axis X—X. Section 30 also has links 38 projecting in a direction generally perpendicular to a vertical plane passing through axis X—X of anchor section 30. Member 30 is of high strength construction, but of relatively light weight.

Base assembly 24 also includes spaced foot plates 40, with each foot plate 40 having a socket portion 42 projecting diagonally inwardly and upwardly therefrom, as best illustrated in FIGS. 2 and 3. Each foot plate also includes a pair of links 44, 44a projecting outwardly and upwardly from the associated foot plate, and to the approximate level of the links 38 on the transverse anchor section 30. Such links may be readily attached to the respective section by welds. Pivotally coupled in generally loose relation to each link 44a may be a respective hook member 46, which has an inwardly and downwardly inclined hook portion 46a (FIG. 1) which is adapted for detachable interlocking coaction with the respective link 38 on the anchor section 30 of the base assembly. One of links 44 of one of foot sections 40 may be provided with a generally similar hook member 48, which is adapted for locking coaction with the link 44 on the other of the foot sections to detachably and flexibly tie the latter together. Each of the socket portions 42 is adapted to receive therein a strut member 50 of tubular nature, projecting upwardly therefrom and in generally axial alignment with the respective socket. Removable pins 52 extending through complementary openings in the sockets and struts, may detachably hold the struts in assembled relation with the respective socket. The upper end of each strut is preferably flattened as at 54, and has an opening therethrough, pivotally supporting a collar member 56, such collar member having trunnions 56a thereon rotatably received in the complementary openings in the flattened portions 54 of the struts. Removable pins 58 may detachably hold the collar in assembled relation with the struts. With such an arrangement, the collar 56 has considerable flexibility with respect to anchor section 30 of the base assembly.

As shown, the collar 56 preferably comprises a two-piece structure, formed by a generally deep U-shaped portion 60 having ears 60a projecting outwardly therefrom, and a shallower U-shaped portion 62 having ears 62a projecting outwardly therefrom, and formed generally complementary to the orientation of the ears 60a. Bolt and nut assemblies 66 may be utilized for holding such collar sections in the generally cylindrical configuration illustrated. It will be seen that such an arrangement facilitates the assembly of the ram 10 to the base section, and with the collar being disposed in generally loose, encircling relationship with the ram.

As may be best seen in FIG. 4, the raised lug section 36 on section 30 of the base assembly 24 may be of the ladder-like configuration illustrated, in plan view, and the aforementioned lugs 26, 26a on the bottom of the ram cylinder 12 are adapted to support the ram bottom in somewhat spaced relation to the lug structure 36. Lugs 26, 26a on the cylinder 12 are disposed on opposite sides of bar 37 in spaced relation thereto, and are also encompassed by bars 37a. Thus it will be seen that while the ram is generally loosely interlocked in generally horizontal directions with the base assembly 24, it may be tilted somewhat from perfectly perpendicular orientation with respect to member 30 to additionally compensate for uneven ground on which the base assembly may rest in juxtaposed relation to a pole or pole butt P. It will also be seen that the flexibility of the base assembly occasioned by the connection of the foot plate 40 to the transverse anchor section 30, and to one another, by means of hooks 46, 48, which are movable with respect to the associated link members of such parts, greatly facilitates the application of the pole jack to a pole or pole butt, even though the ground around the pole is not completely even. Such an arrangement also provides increased stability to the base assembly upon application of fluid pressure to the ram to cause the head portion 20 thereof to raise and pull an associated pole from planted condition in the ground.

As aforementioned, the ram may be conveniently coupled by means of flexible conduit lines (not shown) to a source of pressurized fluid, for instance the usual source of pressurized fluid found on a conventional utility type of vehicle, for operating the ram. Such conduit lines may be coupled to a conventional directional control valve so that the direction of flow of pressurized fluid can be controlled from the source on the utility vehicle. When pressurized fluid is applied to the ram via conduit 14, the associated jack head 20 is moved upwardly, and when the flexible chain 21 is in encircling gripping relationship with the pole, the pole is quickly and effectively pulled or lifted from its implanted relationship in the ground.

The pole jack is adapted to be easily handled by a single workman, the whole assembly being of extremely light weight, and can be quickly and expeditiously mounted adjacent a pole for removal thereof from the ground. It will be seen that a workman can quickly assemble the base assembly, and can easily and quickly assemble the ram with such base assembly.

From the foregoing discussion and accompanying drawings it will be seen that the invention provides a novel, fluid powered pole jack, for expeditious removal of a pole or pole butt from implanted condition in the ground, and a jack which can be readily handled by a single workman, and assembled in generally juxtaposed relation to and encompassing relation to a pole. There is also provided a pole jack which includes a novel arrangement of base assembly, and which base assembly possesses considerable flexibility or adjustability, for greatly facilitating the application of the jack to the pole or pole butt, and compensating for uneven ground conditions on which the base assembly may rest.

The terms and expressions which have been used are used as terms of description and not of limitation, and there is no intention in the use of such terms and expressions of excluding any of the features shown or described, or portions thereof, and it is recognized that various modifications are possible within the scope of the invention claimed.

We claim:

1. A portable pole jack comprising a base assembly, a reciprocal fluid powered motor unit adapted for generally vertical mounting on said base assembly, means operatively coupled to said motor unit for providing for the gripping of a pole to lift the latter, upon application of pressurized fluid to said motor unit, said base assembly comprising a plurality of spaced individual parts including means coacting with upper and lower portions of said motor unit for supporting the latter in its generally vertical mounting position, and means flexibly connecting said parts together into an integral unit and providing for generally universal movement of said parts with respect to one another.

2. A portable pole jack in accordance with claim 1, wherein said base assembly comprises a transverse anchor section adapted for supporting said motor unit thereon, and planar-like foot sections spaced outwardly from said anchor section, said means flexibly connecting the parts of the base assembly together comprising hook-like members movably mounted on one of the sections and removably hooked to the other of the sections, and said means coacting with said upper portion of said motor unit comprising strut means projecting upwardly from said foot sections and detachably coupled to said upper portion of the motor unit, for aiding in supporting the motor unit in vertical position on said anchor section.

3. A portable pole jack in accordance with claim 2, wherein said motor unit includes means thereon spacing the underside of the motor unit's cylinder from said anchor section, whereby the motor unit may be tilted from perpendicular with respect to said anchor section, and means on said anchor section coacting with said spacing means on said motor unit and interlocking the latter with said anchor section for limiting horizontal movement thereof with respect to said anchor section.

4. A portable pole jack in accordance with claim 2, wherein said means coacting with said upper portion of said motor unit comprises collar means pivotally mounted on said strut means for rotation about a generally horizontal axis, said collar means adapted to encircle said motor unit in generally closed condition, said collar means including means for selectively opening said collar means for providing for convenient assembly and detachment of said collar means to and from said motor unit.

5. A portable pole jack comprising a base assembly, a reciprocal fluid powered ram detachably mounted on said base assembly in generally vertically oriented condition, means on said ram adapted for interlocking coaction with a flexible member which is adapted to encircle a pole and grip the latter for lifting the flexible member upwardly upon actuation of said ram and thereby lift the pole upwardly out of implanted condition in the ground, said base assembly comprising a generally transverse anchor section on which the ram is supported, and means on said anchor section for interlocking the ram to the anchor section by limiting horizontal movement of the ram with respect to the anchor section, and planar-type foot sections spaced outwardly from said anchor section and from one another and adapted to be disposed in spaced relationship to the pole, each of said foot sections having a tubular strut projecting diagonally upwardly in converging relation from the respective foot section, a collar pivotally mounted for rotation about a generally horizontal axis on said struts, said collar being disposed in encompassing relation to said ram adjacent the upper end thereof, and means flexibly connecting each of said foot sections to said anchor section of said base assembly and to one another, said flexibly connecting means providing for generally universal movement of said foot and anchor sections with respect to one another and comprising a plurality of links attached to each of said base assembly sections, and a hook member movably mounted on a respective link and adapted for detachable interlocking coaction with an associated link on another section, for flexibly maintaining said base assembly sections in assembled relation while permitting adjustment of said base assembly for uneven ground conditions.

6. A portable pole jack in accordance with claim 5, wherein said anchor section comprises a generally hollow box-like member, handle means on said anchor section, and said foot sections each comprising a flat plate having a socket projecting upwardly therefrom, each of the sockets being adapted to receive a respective strut therein.

7. A portable pole jack in accordance with claim 5, wherein said links on said foot sections and on said anchor section are disposed at approximately the same elevation with respect to one another, and with reference to a horizontal plane.

8. A portable pole jack in accordance with claim 5, wherein said ram includes spaced lugs depending from the underside thereof which space the cylinder of said ram from the confronting surface of said anchor section, said anchor section ram interlocking means including generally centrally oriented means disposed in partially encompassing and interlocking relation with said ram lugs for interlocking the ram in generally horizontal directions with said anchor section, but permitting tilting of said ram in generally vertical planes with respect to said base assembly.

9. A portable pole jack in accordance with claim 5, wherein said collar is of a multi-piece openable construction, and means for selectively maintaining said multi-piece collar in assembled relation.

10. A base assembly for a portable pole jack of the type which includes a reciprocal fluid powered motor unit adapted for generally vertical mounting on said base assembly, said base assembly comprising, a plurality of spaced individual parts including means coacting with the upper and lower portions of said motor unit for supporting the latter in its generally vertical position, and means flexibly connecting said parts together into an integral unit and providing for generally universal movement of the parts with respect to one another, said base assembly parts including a transverse anchor section adapted for supporitng the motor unit thereon and planar-like foot sections spaced outwardly from said anchor section to one side thereof, said means flexibly connecting the parts of the base assembly together comprising hook-like members movably mounted on certain of the sections and removably hooked to other of the sections, said means coacting with said upper portion of said motor unit comprising strut means projecting diagonally upwardly and inwardly from said foot sections and including movable means at their upper ends for detachably coupling with the upper portion of the motor unit.

11. A base assembly in accordance with claim 10, wherein said anchor section includes generally centrally oriented lug means disposed in a generally polygonal configuration in plan view and adapted for interlocking coaction with spaced lug means on the underside of the motor unti, for interlocking the motor unit to the anchor section by limiting horizontal movement of the motor unit with respect to the anchor section, but still permitting tilting of the motor unit with respect to the anchor section.

12. A base assembly in accordance with claim 11, wherein each of said planar-like foot sections comprises a socket extending diagonally upwardly therefrom and adapted to receive the respective strut means in the socket, and with a collar pivotally mounted on the upper ends of said strut means for rotation about a generally horizontal axis on said strut means, and in overlying relation to said interlocking lug means on said anchor section.

References Cited in the file of this patent
UNITED STATES PATENTS

| | | |
|---|---|---|
| 2,341,542 | Grime | Feb. 15, 1944 |
| 2,351,611 | Hammond | June 20, 1944 |
| 2,625,352 | Sykes et al. | Jan. 13, 1953 |
| 2,757,903 | Bill | Aug. 7, 1956 |